United States Patent
Tips

(10) Patent No.: US 7,242,103 B2
(45) Date of Patent: Jul. 10, 2007

(54) DOWNHOLE ELECTRICAL POWER GENERATOR

(75) Inventor: Timothy R. Tips, Spring, TX (US)

(73) Assignee: Welldynamics, Inc., Spring, TX (US)

( * ) Notice: Subject to any disclaimer, the term of this patent is extended or adjusted under 35 U.S.C. 154(b) by 0 days.

(21) Appl. No.: 11/346,908

(22) Filed: Feb. 3, 2006

(65) Prior Publication Data

US 2006/0175838 A1    Aug. 10, 2006

(30) Foreign Application Priority Data

Feb. 8, 2005    (WO) ............... PCT/US2005/003911

(51) Int. Cl.
*H02P 9/04* (2006.01)

(52) U.S. Cl. ........................ 290/1 R; 310/36

(58) Field of Classification Search ............ None
See application file for complete search history.

(56) References Cited

U.S. PATENT DOCUMENTS

| | | | |
|---|---|---|---|
| 1,885,820 A | 11/1932 | Gothard et al. | |
| 2,895,063 A | 7/1959 | Morris | |
| 2,960,109 A | 11/1960 | Wilson | |
| 3,342,267 A | 9/1967 | Cotter et al. | |
| 3,398,302 A | 8/1968 | Harnau et al. | |
| 3,448,305 A * | 6/1969 | Raynal et al. ............ | 310/17 |
| 3,663,845 A | 5/1972 | Apstein | |
| 3,766,399 A | 10/1973 | Demetrescu | |
| 3,772,541 A | 11/1973 | Campagnuolo et al. | |
| 3,968,387 A | 7/1976 | Scarff | |
| 3,970,877 A | 7/1976 | Russell et al. | |
| 4,015,234 A | 3/1977 | Krebs | |
| 4,047,832 A | 9/1977 | Sforza | |
| 4,215,426 A | 7/1980 | Klatt | |
| 4,362,106 A | 12/1982 | Campagnuolo et al. | |

(Continued)

FOREIGN PATENT DOCUMENTS

| | | |
|---|---|---|
| GB | 20044822 | 10/1980 |
| WO | WO 01/39284 | 5/2001 |
| WO | WO 02/10553 | 2/2002 |
| WO | WO 02/057589 | 7/2002 |

OTHER PUBLICATIONS

Examination Report for UK application serial No. GB0419933.7.

(Continued)

*Primary Examiner*—Joseph Waks
(74) *Attorney, Agent, or Firm*—Smith IP Services, P.C.

(57) ABSTRACT

A downhole electrical power generator. A downhole electrical power generating system includes a flow restricting device which variably restricts flow through an opening, the restricting device vibrating in response to flow through the opening and the restricting device thereby alternately increasing and decreasing flow through the opening; and an electricity generating device which generates electricity in response to vibration of the restricting device. Another downhole electrical power generating system includes a flow restricting device which vibrates in response to flow through an opening, the restricting device thereby alternately increasing and decreasing flow through the opening, a pressure differential across the restricting device variably biasing the restricting device to increasingly restrict flow through the opening, and the pressure differential alternately increasing and decreasing in response to respective alternate increasing and decreasing flow through the opening; and an electricity generating device which generates electricity in response to vibration of the restricting device.

20 Claims, 2 Drawing Sheets

U.S. PATENT DOCUMENTS

| | | | |
|---|---|---|---|
| 4,387,318 A | 6/1983 | Kolm et al. | |
| 4,415,823 A | 11/1983 | Jurgens | |
| 4,416,000 A | 11/1983 | Scherbatskoy | |
| 4,464,939 A | 8/1984 | Corpron | |
| 4,467,236 A | 8/1984 | Kolm et al. | |
| 4,491,738 A | 1/1985 | Kamp | |
| 4,536,674 A | 8/1985 | Schmidt | |
| 4,627,294 A | 12/1986 | Lew | |
| 4,761,575 A * | 8/1988 | Reder et al. | 310/36 |
| 4,769,569 A | 9/1988 | Stahlhuth | |
| 4,808,874 A | 2/1989 | Stahlhuth | |
| 4,825,421 A | 4/1989 | Jeter | |
| 5,101,907 A | 4/1992 | Schultz et al. | |
| 5,140,203 A * | 8/1992 | Reder et al. | 310/29 |
| 5,202,194 A | 4/1993 | VanBerg, Jr. | |
| 5,295,397 A | 3/1994 | Hall et al. | |
| 5,547,029 A | 8/1996 | Rubbo et al. | |
| 5,554,922 A | 9/1996 | Kunkel | |
| 5,626,200 A | 5/1997 | Gilbert et al. | |
| 5,703,474 A | 12/1997 | Smalser | |
| 5,801,475 A | 9/1998 | Kimura | |
| 5,839,508 A | 11/1998 | Tubel et al. | |
| 5,899,664 A | 5/1999 | Lawrence | |
| 5,907,211 A | 5/1999 | Hall et al. | |
| 5,965,964 A | 10/1999 | Skinner et al. | |
| 5,979,558 A | 11/1999 | Bouldin et al. | |
| 5,995,020 A | 11/1999 | Owens et al. | |
| 6,011,346 A | 1/2000 | Buchanan et al. | |
| 6,020,653 A | 2/2000 | Woodbridge et al. | |
| 6,112,817 A | 9/2000 | Voll et al. | |
| 6,179,052 B1 | 1/2001 | Purkis et al. | |
| 6,217,284 B1 | 4/2001 | Lawrence | |
| 6,351,999 B1 | 3/2002 | Maul et al. | |
| 6,371,210 B1 | 4/2002 | Bode et al. | |
| 6,424,079 B1 | 7/2002 | Carroll | |
| 6,470,970 B1 | 10/2002 | Purkis et al. | |
| 6,478,091 B1 | 11/2002 | Gano | |
| 6,504,258 B2 * | 1/2003 | Schultz et al. | 290/1 R |
| 6,554,074 B2 | 4/2003 | Longbottom | |
| 6,567,013 B1 | 5/2003 | Purkis et al. | |
| 6,567,895 B2 | 5/2003 | Scales | |
| 6,575,237 B2 | 6/2003 | Purkis et al. | |
| 6,585,051 B2 | 7/2003 | Purkis et al. | |
| 6,607,030 B2 | 8/2003 | Bauer et al. | |
| 6,659,184 B1 | 12/2003 | Tips et al. | |
| 6,672,382 B2 | 1/2004 | Schultz | |
| 6,672,409 B1 | 1/2004 | Dock et al. | |
| 6,717,283 B2 | 4/2004 | Skinner et al. | |
| 6,768,214 B2 * | 7/2004 | Schultz et al. | 290/1 R |
| 6,786,285 B2 | 9/2004 | Johnson et al. | |
| 6,874,361 B1 | 4/2005 | Meltz et al. | |
| 6,914,345 B2 | 7/2005 | Webster | |
| 6,920,085 B2 | 7/2005 | Finke et al. | |
| 2002/0096887 A1 | 7/2002 | Schultz et al. | |
| 2005/0051323 A1 * | 3/2005 | Fripp et al. | 166/65.1 |
| 2005/0230973 A1 | 10/2005 | Fripp et al. | |
| 2005/0230974 A1 | 10/2005 | Masters et al. | |
| 2006/0064972 A1 | 3/2006 | Allen | |

OTHER PUBLICATIONS

Office Action dated Aug. 28, 2006 for U.S. Appl. No. 10/826,952.
U.K. Search Report for application No. GB 0419933.7.
International Search Report for PCT/US2005/019087.
Written Opinion for PCT/US2005/019087.
International Search Report for PCT/US2005/029007.
Written Opinion for PCT/US2005/029007.
International Search Report for PCT/US2005/003928.
Written Opinion for PCT/US2005/003928.
International Search Report for PCT/US2005/003911.
Written Opinion for PCT/US2005/003911.
Baker Oil Tools, "Flow Control Systems", undated.
"Extracting Energy From Natural Flow", NASA Tech Briefs, Spring 1980, vol. 5, No. 1, MFS-23989.
Blevins, Robert, "Flow induced vibration", Van Nostrand Reinhold Co., N.Y., 1977; Chapters 3 and 4.

* cited by examiner

DOWNHOLE ELECTRICAL POWER GENERATOR

TECHNICAL FIELD

The present invention relates generally to equipment utilized and operations performed in conjunction with a subterranean well and, in an embodiment described herein, more particularly provides a downhole electrical power generator.

BACKGROUND

A wide variety of downhole well tools may be utilized which are electrically powered. For example, flow control devices, sensors, samplers, packers, instrumentation within well tools, telemetry devices, etc. are available, and others may be developed in the future, which use electricity in performing their respective functions.

In the past, the most common methods of supplying electrical power to well tools were use of batteries and electrical lines extending to a remote location, such as the earth's surface. Unfortunately, some batteries cannot operate for an extended period of time at downhole temperatures, and those that can must still be replaced periodically. Electrical lines extending for long distances can interfere with flow or access if they are positioned within a tubing string, and they can be damaged if they are positioned inside or outside of the tubing string.

Therefore, it may be seen that it would be very beneficial to be able to generate electrical power downhole, e.g., in relatively close proximity to a well tool which consumes the electrical power. This would preferably eliminate the need for batteries, or at least provide a means of charging the batteries downhole, and would preferably eliminate the need for transmitting electrical power over long distances.

SUMMARY

In carrying out the principles of the present invention, a downhole electrical power generator is provided which solves at least one problem in the art. An example is described below in which flow through a tubular string is used to vibrate a flow restricting device, thereby displacing magnets relative to one or more electrical coils.

In one aspect of the invention, a downhole electrical power generating system is provided which includes a flow restricting device for variably restricting flow through an opening. The restricting device vibrates in response to flow through the opening, with the restricting device thereby alternately increasing and decreasing flow through the opening. An electricity generating device generates electricity in response to vibration of the restricting device.

In another aspect of the invention, a downhole electrical power generating system is provided which includes a flow restricting device which vibrates in response to flow through an opening, thereby alternately increasing and decreasing flow through the opening. A pressure differential across the restricting device variably biases the restricting device to increasingly restrict flow through the opening. The pressure differential alternately increases and decreases in response to respective alternate increasing and decreasing flow through the opening. An electricity generating device generates electricity in response to vibration of the restricting device.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
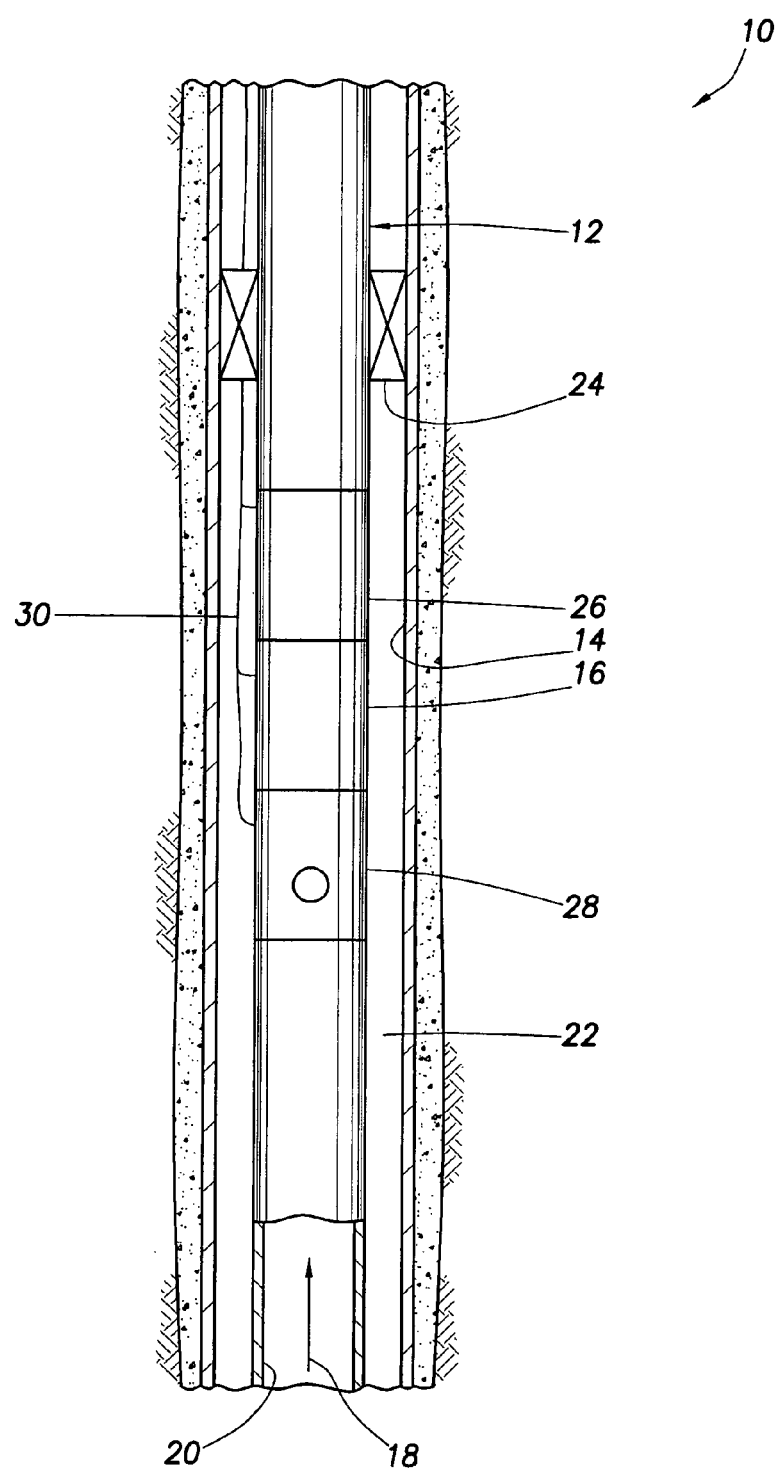
FIG. 1 is a schematic partially cross-sectional view of a downhole electrical power generating system embodying principles of the present invention.

Representatively illustrated in FIG. 1 is a downhole electrical power generating system 10 which embodies principles of the present invention. In the following description of the system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

As depicted in FIG. 1, a tubular string 12 (such as a production, injection, drill, test or coiled tubing string) has been installed in a wellbore 14. An electrical power generator 16 is interconnected in the tubular string 12. The generator 16 generates electrical power from flow of fluid (represented by arrow 18) through an internal flow passage 20 of the tubular string 12.

The fluid 18 is shown in FIG. 1 as flowing upwardly through the tubular string 12 (as if the fluid is being produced), but it should be clearly understood that a particular direction of flow is not necessary in keeping with the principles of the invention. The fluid 18 could flow downwardly (as if being injected) or in any other direction. Furthermore, the fluid 18 could flow through other passages (such as an annulus 22 formed radially between the tubular string 12 and the wellbore 14) to generate electricity, if desired.

The generator 16 is illustrated in FIG. 1 as being electrically connected to various well tools 24, 26, 28 via lines 30 external to the tubular string 12. These lines 30 could instead, or in addition, be positioned within the tubular string 12 or in a sidewall of the tubular string. As another alternative, the well tools 24, 26, 28 (or any combination of them) could be integrally formed with the generator 16, for example, so that the lines 30 may not be used at all, or the lines could be integral to the construction of the generator and well tool(s).

The well tool 24 is depicted in FIG. 1 as being an electrically set packer. For example, electrical power supplied via the lines 30 could be used to initiate burning of a propellant to generate pressure to set the packer, or the electrical power could be used to operate a valve to control application of pressure to a setting mechanism, etc.

The well tool 26 could be any type of well tool, such as a sensor, flow control device, sampler, telemetry device, etc. The well tool 26 could also be representative of instrumentation for another well tool, such as a control module, actuator, etc. for operating another well tool. As another alternative, the well tool 26 could be one or more batteries used to store electrical power for operating other well tools.

The well tool 28 is depicted in FIG. 1 as being a flow control device, such as a sliding sleeve valve or variable choke. The well tool 28 is used to control flow between the passage 20 and the annulus 22. Alternatively, the well tool 28 could be a flow control device which controls flow in the passage 20, such as a safety valve.

Although certain types of well tools 24, 26, 28 are described above as being operated using electrical power generated by the generator 16, it should be clearly understood that the invention is not limited to use of the generator 16 with any particular type of well tool. The invention is also not limited to any particular type of well installation or configuration.

Figure 2:
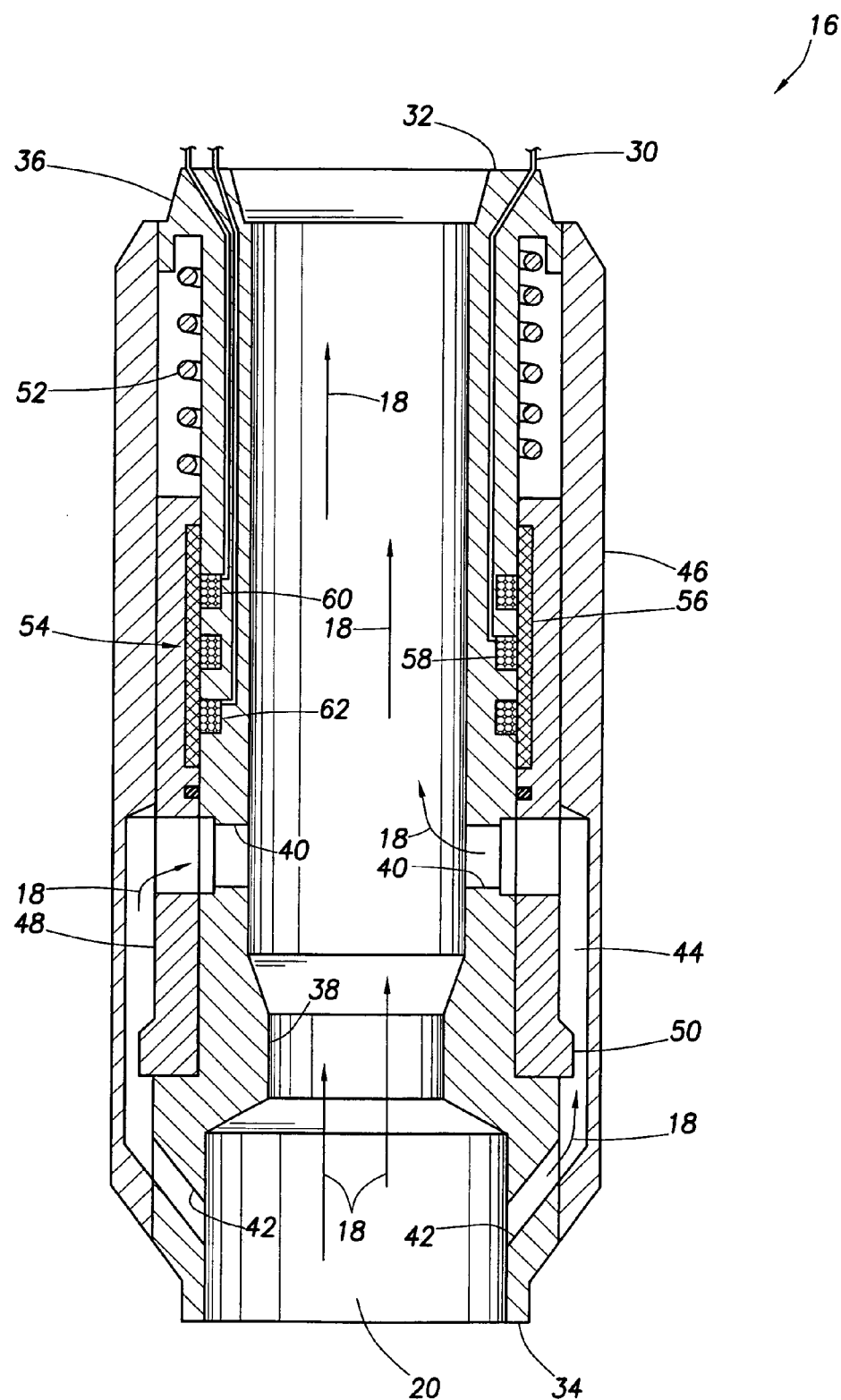
FIG. 2 is an enlarged scale schematic cross-sectional view of an electrical power generator which may be used in the system of FIG. 1.

Referring additionally now to FIG. 2 an enlarged scale schematic cross-sectional view of the generator 16 is representatively illustrated. The generator 16 is shown apart from the remainder of the system 10, it being understood that in use the generator would preferably be interconnected in the tubular string 12 at upper and lower end connections 32, 34 so that the passage 20 extends through the generator.

Accordingly, in the system 10 the fluid 18 flows upwardly through the passage 20 in the generator 16. The fluid 18 could flow in another direction (such as downwardly through the passage 20, etc.) if the generator 16 is used in another system.

The passage 20 extends through a generally tubular housing 36 of the generator 16. The housing 36 may be a single tubular member or it may be an assembly of separate components.

Note that the housing 36 includes a flow diverter 38 in the form of a venturi in the passage 20. As the fluid 18 flows through the diverter 38, a pressure differential is created, in a manner well understood by those skilled in the art. Pressure in the passage 20 upstream of the diverter 38 will, therefore, be greater than pressure downstream of the diverter.

The housing 36 also includes openings 40 formed through its sidewall downstream of the diverter 38, and openings 42 formed through its sidewall upstream of the restriction. An annulus 44 formed between the housing 36 and an outer housing 46 is in communication with each of the openings 40, 42. Thus, instead of flowing directly through the diverter 38, a portion of the fluid 18 is induced by the pressure differential in the passage 20 to flow through the openings 42 upstream of the diverter 38 to the chamber 44, and from the chamber through the openings 40 back into the passage 20 downstream of the diverter.

Note that it is not necessary for the diverter 38 to include a restriction in the passage 20 in order to divert the portion of the fluid 18 to flow through the annulus 44. For example, the diverter 38 could instead include an enlarged flow area (such as, provided by an annular recess) in the passage 20 at the openings 40, so that a pressure reduction is created in the annulus 44 via the openings 40, thereby drawing fluid into the chamber from the passage via the openings 42 upstream of the enlarged flow area. In this manner, the pressure differential may be created in the passage 20 without restricting flow or access through the passage.

A flow restricting device 48 is positioned in the chamber 44. The device 48 operates to variably restrict flow through the openings 40, for example, by varying an unobstructed flow area through the openings. The device 48 is illustrated as a sleeve, but other configurations, such as needles, cages, plugs, etc., could be used in keeping with the principles of the invention.

As depicted in FIG. 2, the openings 40 are fully open, permitting relatively unobstructed flow through the openings. If, however, the device 48 is displaced upwardly, the flow area through the openings 40 will be increasingly obstructed, thereby increasingly restricting flow through the openings.

The device 48 has an outwardly extending annular projection 50 formed thereon which restricts flow through the chamber 44. Because of this restriction, another pressure differential is created in the chamber 44 between upstream and downstream sides of the projection 50. As the fluid 18 flows through the chamber 44, the pressure differential across the projection 50 biases the device 48 in an upward direction, that is, in a direction which operates to increasingly restrict flow through the openings 40.

Upward displacement of the device 48 is resisted by a biasing device 52, such as a coil spring, gas charge, etc. The biasing device 52 applies a downwardly directed biasing force to the device 48, that is, in a direction which operates to decreasingly restrict flow through the openings 40.

If the force applied to the device 48 due to the pressure differential across the projection 50 exceeds the biasing force applied by the biasing device 52, the device 48 will displace upward and increasingly restrict flow through the openings 40. If the biasing force applied by the biasing device 52 to the device 48 exceeds the force due to the pressure differential across the projection 50, the device 48 will displace downward and decreasingly restrict flow through the openings 40.

Note that if flow through the openings 40 is increasingly restricted, then the pressure differential across the projection 50 will decrease and less upward force will be applied to the device 48. If flow through the openings is less restricted, then the pressure differential across the projection 50 will increase and more upward force will be applied to the device 48.

Thus, as the device 48 displaces upward, flow through the openings 40 is further restricted, but less upward force is applied to the device. As the device 48 displaces downward, flow through the openings 40 is less restricted, but more upward force is applied to the device. Preferably, this alternating of increasing and decreasing forces applied to the device 48 causes a vibratory up and down displacement of the device relative to the housing 36.

An electrical power generating device 54 uses this vibratory displacement of the device 48 to generate electricity. As depicted in FIG. 2, the generating device 54 includes a stack of annular shaped permanent magnets 56 carried on the device 48, and a coil 58 carried on the housing 36.

Of course, these positions of the magnets 56 and coil 58 could be reversed, and other types of generating devices may be used in keeping with the principles of the invention. For example, any of the generating devices described in U.S. Pat. No. 6,504,258, in U.S. published application no. 2002/0096887, or in U.S. application Ser. Nos. 10/826,952 10/825,350 and 10/658,899 could be used in place of the generating device 54. The entire disclosures of the above-mentioned patent and pending applications are incorporated herein by this reference.

It will be readily appreciated by those skilled in the art that as the magnets 56 displace relative to the coil 58 electrical power is generated in the coil. Since the device 48 displaces alternately upward and downward relative to the housing 36, alternating polarities of electrical power are generated in the coil 58 and, thus, the generating device 54 produces alternating current. This alternating current may be converted to direct current, if desired, using techniques well known to those skilled in the art.

Note that the generator 16 could be used to produce electrical power even if the fluid 18 were to flow downwardly through the passage 20, for example, by inverting the generator in the tubular string 12. Thus, the invention is not limited to the specific configuration of the generator 16 described above.

It may be desirable to be able to regulate the vibration of the device 48, or to stop displacement of the device altogether. For example, damage to the generating device 54 might be prevented, or its longevity may be improved, by limiting the amplitude and/or frequency of the vibratory displacement of the device 48. For this purpose, the generating device 54 may include one or more additional coils or dampening devices 60, 62 which may be energized with electrical power to vary the amplitude and/or frequency of displacement of the device 48.

The electrical power to energize the dampening devices 60, 62 may have been previously produced by the generating device 54 and stored in batteries or another storage device (not shown in FIG. 2). When energized, magnetic fields produced by the dampening devices 60, 62 can dampen the vibratory displacement of the device 48 and, if strong enough, even prevent such displacement.

Note that, instead of the annulus 44 being formed between the housing 36 and outer housing 46, the annulus 44 could be the annulus 22, in which case the outer housing 46 may not be used at all. Thus, the portion of the fluid 18 could be diverted from the passage 20 to the annulus 22 via the openings 42, and then return to the passage via the openings 40. As another alternative, the fluid 18 could flow from the annulus 22 into the passage 20 via the openings 40, without first being diverted from the passage to the annulus via the openings 42. In this alternative, the diverter 38, openings 42 and outer housing 46 would not be used, and the device 48 would create a pressure differential in the annulus 22 due to the fluid 18 flowing past the projection 50 in the annulus.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A downhole electrical power generating system, comprising:
   a flow restricting device which variably restricts fluid flow through an opening, the restricting device vibrating in response to the fluid flow, and the restricting device thereby alternately increasing and decreasing the fluid flow through the opening;
   a flow passage formed longitudinally through a housing, the flow passage being a main internal flow passage for the fluid flow through a tubular string, pressure in a first longitudinal portion of the flow passage being greater than pressure in a second longitudinal portion of the flow passage due to the fluid flow, and the opening providing fluid communication between the first and second flow passage portions; and
   an electricity generating device which generates electricity in response to vibration of the restricting device.

2. The system of claim 1, wherein the generating device includes at least one magnet which displaces relative to at least one coil in response to vibration of the restricting device.

3. The system of claim 1, further comprising a dampening device for controlling a vibration of the restricting device.

4. The system of claim 3, wherein the dampening device controls a frequency of the restricting device vibration.

5. The system of claim 3, wherein the dampening device controls an amplitude of the restricting device vibration.

6. A downhole electrical power generating system, comprising:
   a flow restricting device which variably restricts fluid flow through an opening, the restricting device vibrating in response to the fluid flow, and the restricting device thereby alternately increasing and decreasing the fluid flow through the opening;
   an electricity generating device which generates electricity in response to vibration of the restricting device; and
   a dampening device for controlling a vibration of the restricting device, the dampening device including a coil which is energized to variably dampen the restricting device vibration.

7. A downhole electrical power generating system, comprising:
   a flow restricting device which variably restricts fluid flow through an opening, the restricting device vibrating in response to the fluid flow, and the restricting device thereby alternately increasing and decreasing the fluid flow through the opening;
   an electricity generating device which generates electricity in response to vibration of the restricting device; and
   a housing which includes an internal flow passage with a flow diverter therein, the flow passage being a main internal flow passage for the fluid flow through a tubular string, the flow diverter creating a pressure differential in the flow passage which induces a portion of fluid flowing through the passage to flow into an annulus surrounding the flow passage and to flow from the annulus through the opening to return to the flow passage.

8. The system of claim 7, wherein the restricting device variably restricts the fluid flow from the annulus through the opening to the flow passage.

9. The system of claim 7, wherein the restricting device includes a projection which creates a pressure differential in the annulus in response to the fluid flow through the annulus, the pressure differential in the annulus biasing the restricting device to increasingly restrict the fluid flow through the opening.

10. The system of claim 9, further comprising a biasing device which applies a biasing force to the restricting device in a direction to decreasingly restrict the fluid flow through the opening.

11. A downhole electrical power generating system, comprising:
   a flow restricting device which vibrates in response to fluid flow through an opening, the restricting device thereby alternately increasing and decreasing the fluid flow through the opening, a pressure differential across the restricting device variably biasing the restricting device to increasingly restrict the fluid flow through the opening, and the pressure differential alternately increasing and decreasing in response to respective alternate increasing and decreasing flow through the opening;

a flow passage formed longitudinally through a housing, the flow passage being a main internal flow passage for the fluid flow through a tubular string, pressure in a first longitudinal portion of the flow passage being greater than pressure in a second longitudinal portion of the flow passage due to the fluid flow, and the opening providing fluid communication between the first and second flow passage portions; and an electricity generating device which generates electricity in response to vibration of the restricting device.

12. The system of claim 11, wherein the generating device includes at least one magnet which displaces relative to at least one coil in response to vibration of the restricting device.

13. The system of claim 11, further comprising a dampening device for controlling a vibration of the restricting device.

14. The system of claim 13, wherein the dampening device controls a frequency of the restricting device vibration.

15. The system of claim 13, wherein the dampening device controls an amplitude of the restricting device vibration.

16. A downhole electrical power generating system, comprising:

a flow restricting device which vibrates in response to fluid flow through an opening, the restricting device thereby alternately increasing and decreasing the fluid flow through the opening, a pressure differential across the restricting device variably biasing the restricting device to increasingly restrict the fluid flow through the opening, and the pressure differential alternately increasing and decreasing in response to respective alternate increasing and decreasing flow through the opening;

an electricity generating device which generates electricity in response to vibration of the restricting device; and a housing which includes an internal flow passage with a flow diverter therein, the flow passage being a main internal flow passage for the fluid flow through a tubular string, the flow diverter creating a differential pressure in the flow passage which induces a portion of fluid flowing through the passage to flow into an annulus surrounding the flow passage and to flow from the annulus through the opening to return to the flow passage.

17. The system of claim 16, wherein the restricting device variably restricts the fluid flow from the annulus through the opening to the flow passage.

18. The system of claim 16, wherein the restricting device includes a projection which creates the pressure differential across the restricting device in the annulus in response to the fluid flow through the annulus.

19. The system of claim 18, further comprising a biasing device which applies a biasing force to the restricting device in a direction to decreasingly restrict the fluid flow through the opening.

20. A downhole electrical power generating system, comprising:

a flow restricting device which vibrates in response to fluid flow through an opening, the restricting device thereby alternately increasing and decreasing the fluid flow through the opening, a pressure differential across the restricting device variably biasing the restricting device to increasingly restrict the fluid flow through the opening, and the pressure differential alternately increasing and decreasing in response to respective alternate increasing and decreasing flow through the opening;

an electricity generating device which generates electricity in response to vibration of the restricting device; and a dampening device for controlling a vibration of the restricting device, the dampening device including a coil which is energized to variably dampen the restricting device vibration.

* * * * *